United States Patent
Arkan et al.

(10) Patent No.: US 10,166,963 B2
(45) Date of Patent: Jan. 1, 2019

(54) SERVICE BRAKE CHAMBER MANUFACTURED WITH COMPOSITE PRESSURE HOUSING AND NON-PRESSURE HOUSING AND A CONNECTION METHOD OF THIS CHAMBER

(71) Applicant: ARFESAN ARKAN FREN ELEMANLARI SANAYI VE TICARET A. Ş., Kocaeli (TR)

(72) Inventors: Fuat Burtan Arkan, Kocaeli (TR); Yavuz Battal, Kocaeli (TR); Omer Faruk Kulac, Kocaeli (TR)

(73) Assignee: ARFESAN ARKAN FREN ELEMANLARI SANAYI VE TICARET A. S., Kocaeli (TR)

( * ) Notice: Subject to any disclaimer, the term of this patent is extended or adjusted under 35 U.S.C. 154(b) by 150 days.

(21) Appl. No.: 15/505,121

(22) PCT Filed: Apr. 2, 2015

(86) PCT No.: PCT/TR2015/000139
§ 371 (c)(1),
(2) Date: Feb. 20, 2017

(87) PCT Pub. No.: WO2016/039700
PCT Pub. Date: Mar. 17, 2016

(65) Prior Publication Data
US 2017/0210370 A1    Jul. 27, 2017

(30) Foreign Application Priority Data
Sep. 9, 2014    (TR) .................................. 2014/10553

(51) Int. Cl.
*B60T 17/08*    (2006.01)
*B29C 45/00*    (2006.01)
(Continued)

(52) U.S. Cl.
CPC .......... *B60T 17/081* (2013.01); *B60T 17/088* (2013.01); *B29C 45/0005* (2013.01); *F16B 3/00* (2013.01); *F16B 21/10* (2013.01); *F16J 13/12* (2013.01)

(58) Field of Classification Search
CPC .... B60T 17/081; B60T 17/083; B60T 17/088; B60T 13/24; B60T 13/44; B60T 13/567;
(Continued)

(56) References Cited

U.S. PATENT DOCUMENTS 3,883,030 A    5/1975    Mathews et al.
4,887,513 A *  12/1989   Ewald .................. B60T 17/083
                                                        92/63
(Continued)

FOREIGN PATENT DOCUMENTS

DE    3026596 A1 *  2/1982  ............ B60T 17/081
TR    200804238 A2   12/2008
(Continued)

OTHER PUBLICATIONS

Translation of DE3026596A1, generated Oct. 29, 2018.*

*Primary Examiner* — Matthew P Travers
(74) *Attorney, Agent, or Firm* — Gokalp Bayramoglu

(57) ABSTRACT

This invention is related to a service brake chamber manufactured with a composite pressure housing and a non-pressure housing, used in the air brake system of heavy vehicles such as trucks, trailers lorries and buses and a connection method of pressure housing and non-pressure housing forms this chamber.

5 Claims, 2 Drawing Sheets

(51) Int. Cl.
*F16B 3/00* (2006.01)
*F16J 13/12* (2006.01)
*F16B 21/10* (2006.01)

(58) Field of Classification Search
CPC ............. B29L 2031/7482; F16D 65/28; F16D 2121/08; F16D 2125/04; F16D 2200/006; F16D 2250/0084; F16D 2125/12; F16J 3/02; F16J 13/12; F15B 15/10; Y10T 29/49893; Y10T 29/49947; Y10T 29/49959–29/49961; Y10T 403/7047; Y10T 403/7051–403/7054; Y10T 403/55; Y10T 403/553; Y10T 403/585; B29C 45/0005–2045/001; B23P 11/00; B23P 2700/50; F16B 2/14; F16B 2200/406; F16B 3/00; F16B 21/00; F16B 21/10; F16B 21/12; F16B 2021/14
See application file for complete search history.

(56) References Cited

U.S. PATENT DOCUMENTS

| | | | | |
|---|---|---|---|---|
| 5,315,918 A | * | 5/1994 | Pierce | B60T 17/083 403/270 |
| 5,560,280 A | * | 10/1996 | Rumsey | B60T 17/083 29/521 |
| 5,771,774 A | | 6/1998 | Stojic | |
| 6,349,629 B1 | | 2/2002 | Plantan et al. | |
| 7,121,191 B1 | | 10/2006 | Fisher | |
| 2010/0154627 A1 | | 6/2010 | Prager et al. | |

FOREIGN PATENT DOCUMENTS

| | | | | |
|---|---|---|---|---|
| WO | WO9626093 A1 | 8/1996 | | |
| WO | WO9939082 A1 | 8/1999 | | |
| WO | WO0181728 A1 | 11/2001 | | |
| WO | WO03037693 A1 | 5/2003 | | |
| WO | WO 2015043634 A1 | * | 4/2015 | ............ B60T 17/088 |

* cited by examiner

SERVICE BRAKE CHAMBER MANUFACTURED WITH COMPOSITE PRESSURE HOUSING AND NON-PRESSURE HOUSING AND A CONNECTION METHOD OF THIS CHAMBER

CROSS REFERENCE TO RELATED APPLICATIONS

This application is the national phase entry of International Application No. PCT/TR2015/000139 filed on Apr. 2, 2015, which is based upon and claims priority to Turkish Application No. TR2014/10553, filed on Sep. 9, 2014, the entire contents of which are incorporated herein by reference.

TECHNICAL FIELD

This invention is related to a service brake chamber produced of a composite pressure housing and a non-pressure housing, used in the air brake system of heavy vehicles such as trucks, trailers lorries and busses and a connection method of pressure housing and non-pressure housing constitutes this chamber.

BACKGROUND OF THE INVENTION

The brake actuators used in heavy vehicles (bus, lorries, trucks, trailers, etc.) are divided into two groups; one of which is the spring brake actuators and the other is the service brake chambers.

Service brake chambers are used if the vehicle is desired to be stopped or slowed down and functions when the foot brake is actuated.

Compressed air which comes from compressor when the foot brake is actuated by driver, fills pressure chamber between diaphragm and pressure housing. The diaphragm; moves in an upward direction by means of this compressed air, pushes the shaft and enables the braking force, which is transferred to the wheels of the vehicle.

If the vehicle is desired to be fixed or in the case that there is an air leakage in the air system, the emergency chamber of the spring brake actuators brakes and provides fixing the vehicle.

Service chamber of the spring brake actuators are used if the vehicle is desired to be stopped or slowed down and functions when the foot brake is actuated as the service brake chambers.

In the known state of the art, service brake chamber mainly comprises, a pressure housing, a non-pressure housing, diaphragm, shaft and return spring. Air inlet connections are welded onto these parts and all parts are painted and coated to prevent corrosion.

In the known state of the art, pressure housing and non-pressure housing parts of the service brake chambers are produced by means of cold forming such as deep drawing of steel sheet. Connection process between pressure housing and non-pressure housing is performed by fixing with clamp ring and clamp ring bolt after placing and compressing the diaphragm between pressure housing and non-pressure housing by press machine. Sealing is provided, because diaphragm is compressed between pressure housing and non-pressure housing, and this connection is secured by a clamp ring.

Unlike the connection method using clamp ring in the prior art, there are various connection methods like roll-form method which one of the skin of the pressure or non-pressure housing, is bended over the other one, or connection methods using connection rings.

Another service brake chamber involved in the known state of the art is an invention according to the TR 2008 04238 B numbered patent document. In this invention, plastic pressure housing and flange group, and a steel non-pressure housing, are used. The connection between the pressure and non-pressure housing is carried out by bending skirt of the steel non-pressure housing onto the plastic pressure housing.

The service brake chambers which are made of steel sheet (pressure housing, non-pressure housing, flange, etc.) are exposed to corrosion because of atmospheric effects. In the known state of the art, service brake chambers which are made of steel, are coated by protective paintings or coatings to prevent corrosion. But an failure caused by the coating and painting may lead to the untimely damage of the service brake chamber which is of vital importance for heavy commercial vehicles.

In addition, no burrs are required onto the pressure and non-pressure housing parts, to enable service brake chambers operate efficiently and safety. Single burr onto the pressure and non-pressure housing parts even may adversely affect the operation of the chamber. Particularly, during the connection between pressure housing, non-pressure housing and diaphragm, it is very important to be burr-free connecting surfaces. For this reason this parts must be suitable for connection by means of second or third operations (punching, machining etc.) after main deep drawing operation which the parts are produced. This additional processes may lead to additional labor and production costs.

Furthermore, when differences of dimensional measurements and tolerances arising from the pressure and non-pressure housings which are made by steel sheet, press cutting, pressing, machining, stoning, welding, painting and coating etc. operations in the known state of the art, also be added; situation which parts are discarded to scrap, occurs due to different dimensional measurements and tolerances of the parts from values should be, before assembly.

Another technical problem in the known state of the art is connecting the air connection ports on the pressure housing by welding operation. Burr and sealing problems may occur due to mistakes of the welding operations. Sealing has critical importance, because the pressure housing is the part that air pressure which activates the diaphragm, is given.

However, the weigh disadvantage arising from the weight of the steel sheet used in the service brake chambers which are made by steel sheet. The reduction of the weight of the automotive parts in the automotive industry, has a great importance especially in terms of security and low fuel consumption. Service brake chambers have weight disadvantage in the design, vibration and connection fields. Unfortunately, weight factor is not taken into account so much in designing and development processes of the service brake chambers produced in the known state of the art.

In order to overcome the technical problems described above, pressure housing and flange are made of plastic, non-pressure housing is made of steel sheet in the invention described in TR 2008 04238 B numbered application in the known state of the art. In this invention, the connection between the pressure and non-pressure housing is carried out by bending skirt of the steel non-pressure housing onto the plastic pressure housing. Although the important advantages provided by this invention, technical problems are not fully resolved because breakage or deformation may occur on the plastic housing part during the bending skirt of the steel non-pressure housing onto the plastic pressure housing. This deformation and damage, may leads to sealing problem or completely damage of the service brake chamber.

It is necessary to compress the diaphragm between pressure and non-pressure housing by means of applying force, for providing the sealing during the connection between pressure and non-pressure housing of the service brake chambers. There is a possibility of deformation of the plastic part during this connection operation when one of the pressure or non-pressure housing is made by steel and the other one is made by plastic because steel part is harder than plastic part. This is another technical disadvantage of this invention.

In the applications where both pressure housing and non-pressure housing are plastic, metal clamp may give damage the plastic pressure housing and non-pressure housing during the compression of the parts in the case where the connection is provided by a steel clamp.

SUMMARY OF THE INVENTION

In the present invention, non-pressure housing and pressure housing which are made by composite material which has non-metallic polymeric matrix, reinforced with glass fiber or carbon fiber; are used. Pressure and non-pressure housing are thicker than the pressure and non-pressure housing in the known state of the art because pressure and non-pressure housings are made of composite material instead of steel.

Connection between pressure and non-pressure housing, is carried out by keyways on the pressure and non pressure housing and wedges enter the keyways.

Purposes of development of the service brake chamber manufactured with composite pressure housing a non-pressure housing and the connection method of this chamber in the present invention, are listed below.
- Obtaining a service brake chamber which is lower-cost, has same strength with steel, require less precise machining and easy (deburring etc.).
- Obtaining a service brake chamber which has high corrosion resistance.
- Elimination of the press cutting, pressing, machining, stoning, welding painting and coating etc. operations increase the production costs.
- Ensuring the fully sealed and harmless for parts connection between the composite pressure and non-pressure housing owing to connection method in the present invention
- Reduction of risk and product losses arising from a dimensional and tolerance failure caused by steel sheets and press cutting, pressing, machining, stoning, welding, painting and coating etc. operations for steel made parts.

BRIEF DESCRIPTION OF THE DRAWINGS

The figures that have been prepared in order to further explain the service brake chamber manufactured with composite pressure housing a non-pressure housing and the connection method of this chamber developed according to the present invention illustrates the following.

Figure 1:
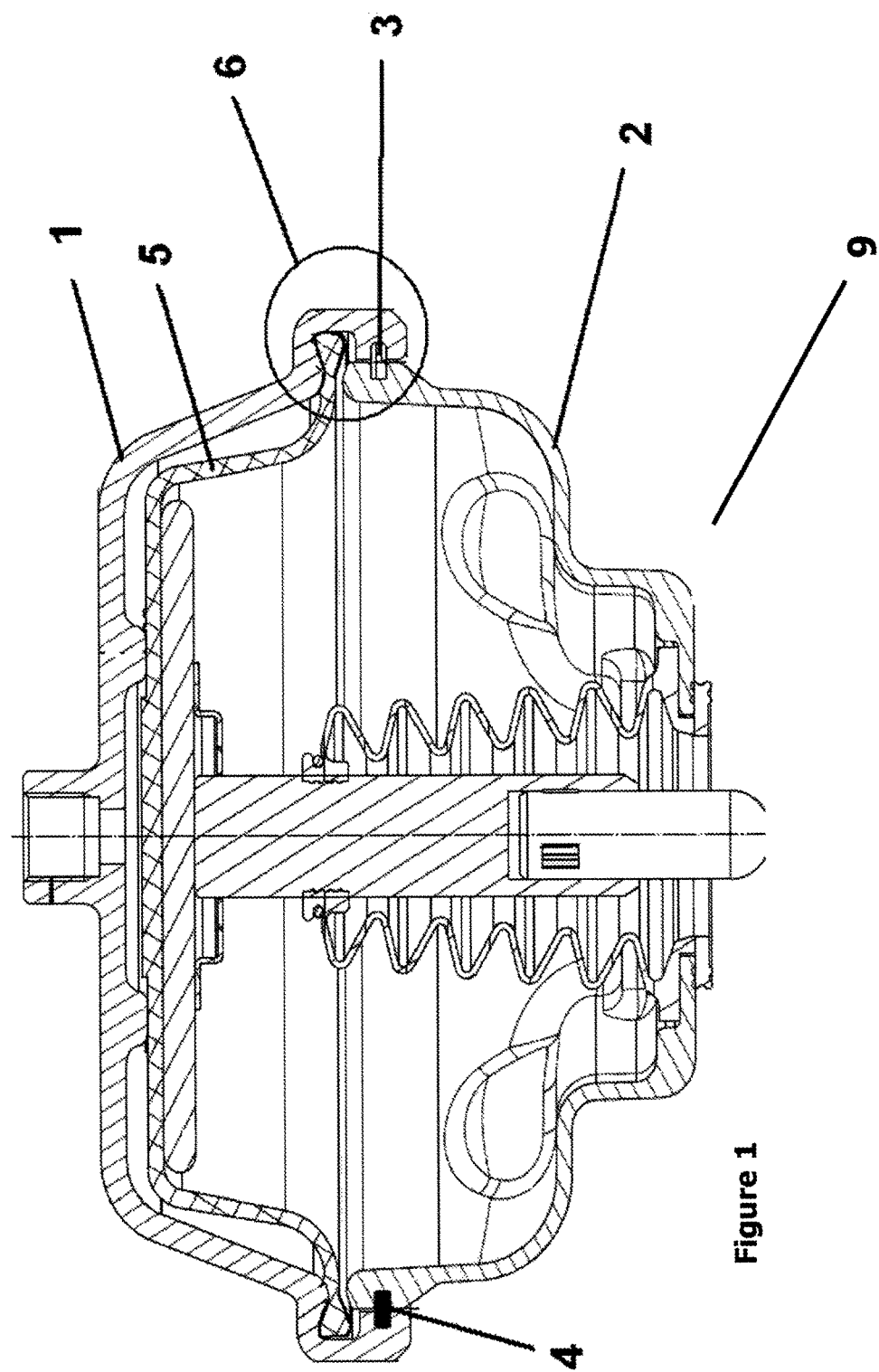
FIG. 1 is the sectional view of the service brake chamber subject to the invention.
Figure 2:
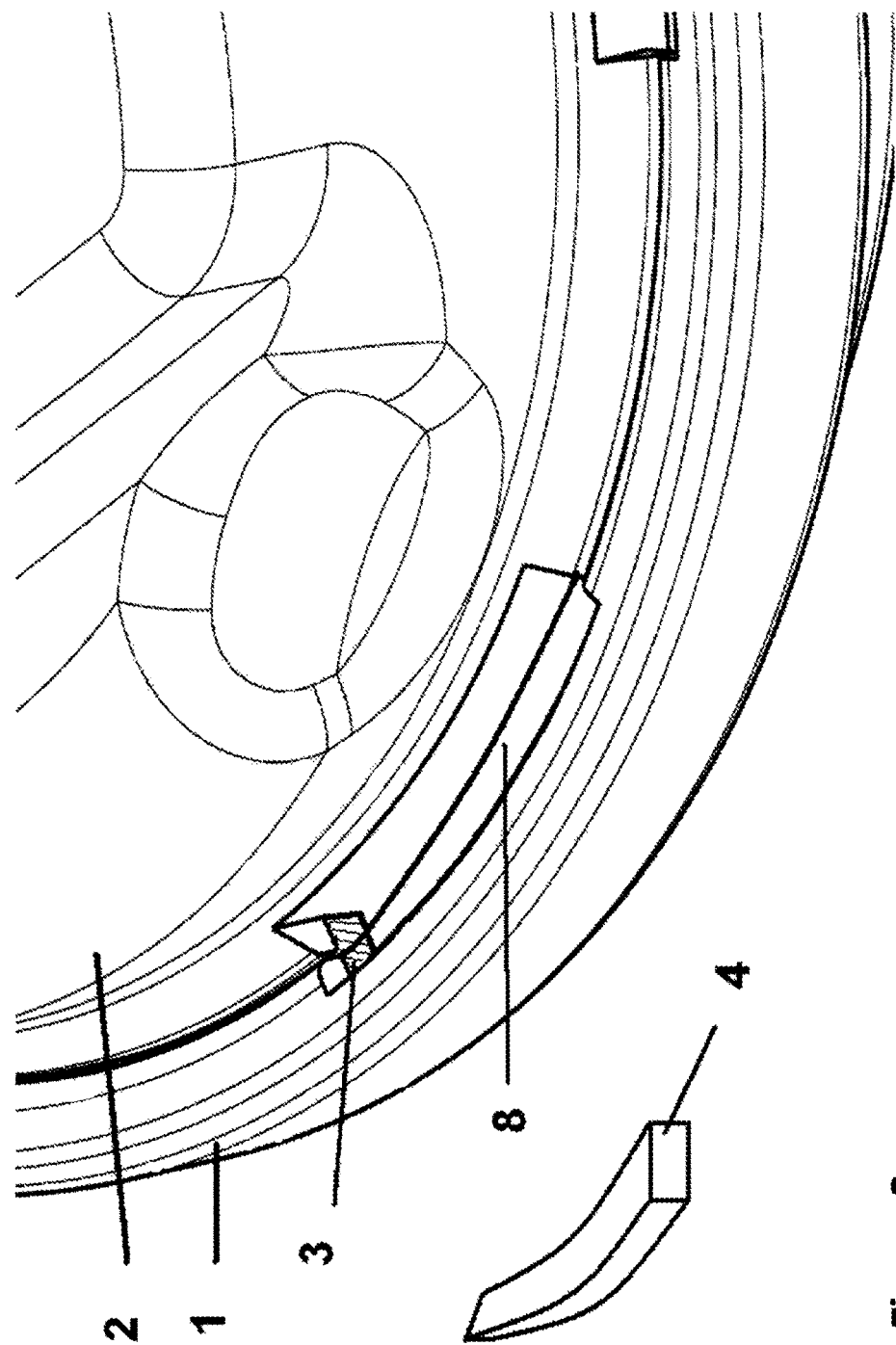
FIG. 2 is the detailed view of the connection method subject too the invention.

The aspects, sections, parts shown in the figures drawn in order to further explain the service brake chamber manufactured with composite pressure housing a non-pressure housing and the connection method of this chamber subject to the invention have each been numbered and the references of these numbers have been listed below.
1. Pressure housing
2. Non-pressure housing
3. Keyways
4. Wedge
5. Diaphragm
6. Connection region
8. Wedge mounting space
9. Service brake chamber

DETAILED DESCRIPTION OF THE INVENTION

Invention subject to the application is a service brake chamber is used if the vehicle is desired to be stopped or slowed down and functions when the foot brake is actuated, used in the air brake system of heavy vehicles (bus, lorries trucks, trailers, etc.) and a connection method between pressure housing (1) and non-pressure housing (2).

Pressure housing (1) and non-pressure housing (2) of the service brake chamber (9) subject to the invention, are made by composite material which has non-metallic polymeric matrix, reinforced with glass fiber or carbon fiber and produced by plastic injection molding process.

The thickness of the pressure (1) and non-pressure housing (2) is more than the pressure and non-pressure housing produced by the steel sheet in the known state of the art.

Sealing must be provided in the connection region (6) in the process which connection between pressure (1) and non-pressure housing (2) is done also the diaphragm (5) is between of them.

Sealing is provided by compressing the diaphragm (5) by pressing pressure (1) and non-pressure housings (2) to each other by press machine and fixing pressure (1) and non-pressure housings (2) to each other completely.

This fixing process in the known state of the art, is carried out by bending skirt of one of the housings onto the other one of housing, or carried out by using clamp.

However, these methods are not suitable because they can damage the pressure (1) and non-pressure housings (2) made front composite materials.

The connection method subject to the invention, pressure housing (1), non-pressure housing (2) and diaphragm (5) between them compressed at rates to provide sealing of the diaphragm (5) by means of press machine to connect composite pressure housing (1) and non-pressure housing (2) and diaphragm (5) between them without housing damages as sealing is provided.

Keyways (3) are occur when half of recesses of pressure housing (1) and the other half of recesses of non-pressure housings (2), aligned by compressing diaphragm (5) at rates to provide sealing. The formed keyways (3) are at least 6 pieces. At least 6 wedge mounting space (8) required for the insertion of the wedges (4) in the keyway (3) in the radial direction is formed during the compression process enables the occurrence of the keyways. Connection process is terminated after the wedges (4) are placed into the wedge mounting spaces (8) and are driven to the keyways (3) in the radial direction.

Connection between pressure (1) and non-pressure housing (2) is fixed by wedges (4) enter the keyways (3) and sealing is provided because diaphragm (5) is compressed at the desired rate. Keyways (3) are designed as blind to prevent displacement of the wedges (4) from keyways (3).

Additionally, the dislocation of the wedged (4) is prevented under effects caused by vibration or other effects caused by operation conditions, by means of filling the wedge mounting spaces (8) by silicon or similar material after the assembly of the wedges (4).

The invention claimed is:

1. A method for realizing a service brake chamber used in an air brake system of heavy vehicles, in which the chamber is formed by connecting a pressure housing and a non-pressure housing,
   wherein the method connects the pressure housing and the non-pressure housing of the service brake chamber, wherein the pressure housing and the non-pressure housing are made by composite material composed of non-metallic polymeric matrices, reinforced with glass fibers or carbon fibers and produced by a plastic injection molding process, wherein the method comprises the following steps:
   compressing the pressure housing, the non-pressure housing and a diaphragm by means of a press machine;
   forming keyways by aligning halves of recesses of the pressure housing with other halves of the respective recesses of the non-pressure housing by compressing the diaphragm to provide sealing;
   forming at least six wedge mounting spaces during the step of compressing, wherein the wedge mounting spaces are required for an insertion of wedges in the keyways in a radial direction, wherein the wedge mounting spaces are formed simultaneously with the keyways;
   placing the wedges into the wedge mounting spaces and driving the wedges to into the keyways in the radial direction.

2. The method according to claim 1, further comprising forming at least six keyways.

3. The method according to claim 1, wherein the keyways are blind to prevent a displacement of the wedges from the keyways.

4. The method according to claim 1, wherein the wedge mounting spaces are filled by silicone or a resin based filler material after an assembly of the wedges.

5. A service brake chamber manufactured according to the method of claim 1.

* * * * *